United States Patent
Muranaka

(10) Patent No.: US 11,370,170 B2
(45) Date of Patent: Jun. 28, 2022

(54) GAS CONCENTRATION METER, CONTROL METHOD OF GAS CONCENTRATION METER, LAMINATION MOLDING APPARATUS, AND CONTROL METHOD OF OXYGEN CONCENTRATION METER FOR LAMINATION MOLDING APPARATUS

(71) Applicant: Sodick Co., Ltd., Kanagawa (JP)

(72) Inventor: Katsutaka Muranaka, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 213 days.

(21) Appl. No.: 16/841,884

(22) Filed: Apr. 7, 2020

(65) Prior Publication Data

US 2020/0368968 A1 Nov. 26, 2020

(30) Foreign Application Priority Data

May 23, 2019 (JP) .............................. JP2019-096759

(51) Int. Cl.
*B29C 67/00* (2017.01)
*B29C 64/343* (2017.01)
(Continued)

(52) U.S. Cl.
CPC .......... *B29C 64/343* (2017.08); *B29C 64/371* (2017.08); *B29C 64/393* (2017.08);
(Continued)

(58) Field of Classification Search
CPC ... B29C 64/343; B29C 64/371; B29C 64/393; B33Y 10/00; B33Y 30/00; B33Y 50/00; B33Y 50/02
See application file for complete search history.

(56) References Cited

U.S. PATENT DOCUMENTS 8,070,474 B2 * 12/2011 Abe ...................... B29C 64/188
425/375
8,550,802 B2 * 10/2013 Fuwa ...................... B22F 10/70
425/375
(Continued)

FOREIGN PATENT DOCUMENTS

JP 3658285 B 6/2005
JP 3885705 B2 2/2007
(Continued)

OTHER PUBLICATIONS

Japanese Office Action dated Dec. 28, 2020, in connection with corresponding JP Application No. 2019-096759 (11 pp., including machine-generated English translation).

*Primary Examiner* — Ryan M Ochylski
(74) *Attorney, Agent, or Firm* — Maier & Maier, PLLC

(57) ABSTRACT

A gas concentration meter includes a first gas concentration detection sensor capable of detecting at least a gas concentration in a first concentration range, a second gas concentration detection sensor capable of detecting at least a gas concentration in a second concentration range, and a control unit. An upper limit value of the second concentration range is lower than an upper limit value of the first concentration range, and a lower limit value of the second concentration range is lower than a lower limit value of the first concentration range. The control unit is configured to output either the lower limit value of the first concentration range or the upper limit value of the second concentration range as an indication value when an output signal of the first gas concentration detection sensor corresponds to a gas concentration lower than the lower limit value of the first concentration range.

17 Claims, 11 Drawing Sheets

(51) Int. Cl.
- *B29C 64/371* (2017.01)
- *B29C 64/393* (2017.01)
- *B33Y 50/02* (2015.01)
- *B33Y 10/00* (2015.01)
- *B33Y 30/00* (2015.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 10,730,142 B2 * | 8/2020 | Zurecki | B23K 26/1437 |
| 2004/0138825 A1 | 7/2004 | Kawase et al. | |
| 2010/0006228 A1 * | 1/2010 | Abe | B29C 64/268 |
| | | | 156/356 |
| 2011/0109016 A1 * | 5/2011 | Fuwa | B29C 64/153 |
| | | | 264/460 |
| 2016/0045981 A1 * | 2/2016 | Zurecki | B33Y 30/00 |
| | | | 219/76.12 |

FOREIGN PATENT DOCUMENTS

| | | |
|---|---|---|
| JP | 2016523735 A | 8/2016 |
| WO | 2008018243 A1 | 2/2008 |

* cited by examiner

GAS CONCENTRATION

GAS CONCENTRATION

GAS CONCENTRATION

GAS CONCENTRATION METER, CONTROL METHOD OF GAS CONCENTRATION METER, LAMINATION MOLDING APPARATUS, AND CONTROL METHOD OF OXYGEN CONCENTRATION METER FOR LAMINATION MOLDING APPARATUS

FIELD

The present application claims priority under 35 U.S.C. § 119 to Japanese Patent Application No. 2019-096759, filed May 23, 2019. The contents of this application are incorporated herein by reference in their entirety. The present disclosure relates to a gas concentration meter and a control method thereof, a lamination molding apparatus and a control method thereof for a lamination molding apparatus.

BACKGROUND

In lamination molding of metal, a material layer made of a metal material is formed, and a beam such as a laser beam or an electron beam irradiates onto a predetermined portion of the material layer to sinter or melt the irradiated material layer to form a solidified layer. Then, a desired three-dimensional molded object is formed by repeating the formation of the material layer and the formation of the solidified layer.

In recent years, the capacity of the lamination molding apparatus for performing lamination molding of such a metal has been improved. With the improvement of the capacity, the applicable range of the lamination molding apparatus of which main purpose is to produce a prototype has been increasing. Particularly in recent years, the opportunity to manufacture important parts and the like by using the lamination molding apparatus has been increasing even in the medical field and the aerospace field. Since parts and the like used in these fields are required to be higher in quality than components used in other fields, it is necessary to perform molding under a low oxygen concentration environment depending on the type thereof.

Furthermore, when molding is performed in an environment with a low oxygen concentration, it is necessary to monitor whether or not the environment can be maintained during the formation.

Therefore, it is necessary to constantly or periodically measure the oxygen concentration in the molding chamber (chamber) in which lamination molding is performed. However, unless a plurality of sensors is used, the oxygen concentration in the molding chamber may not be measured.

It should be noted that in a concentration meter using a plurality of sensors, for instance, as described in Japanese Patent No. 3658285, switching from one sensor to another sensor is performed at a predetermined concentration, and the switching criterion is differed between when the concentration increases and decreases.

SUMMARY

Yet, there are various sensors for detecting the gas concentration, but a sensor having a desired performance may not necessarily be required in consideration of a use environment such as a temperature, performance such as a measurable range and a resolution, a price, and the like. As in the technology described in Japanese Patent No. 3658285, it may be difficult to provide a margin for switching criteria of a plurality of sensors.

Further, since various sensors generally have a detection error, it is more difficult to provide a margin for switching criteria of a plurality of sensors in consideration of the error.

The present invention has been made in view of the above circumstances, and an object thereof is to provide a gas concentration meter, a control method of gas concentration meter, a lamination molding apparatus and a control method of oxygen concentration meter for a lamination molding apparatus in which a detection range is not missed even when a plurality of sensors are used.

According to the present invention, there is provided a gas concentration of a specific gas in a chamber, comprising: a first gas concentration detection sensor configured to detect at least the gas concentration in a first concentration range; a second gas concentration detection sensor configured to detect at least the gas concentration in a second concentration range, wherein an upper limit value of the second concentration range is lower than an upper limit value of the first concentration range, and a lower limit value of the second concentration range is lower than a lower limit value of the first concentration range; a control unit configured to: output an indication value based on an output signal of the first gas concentration detection sensor when an output signal of the first gas concentration detection sensor indicates a gas concentration in the first concentration range and an output signal of the second gas concentration detection sensor indicates a gas concentration higher than the upper limit value of the second concentration range, output an indication value based on an output signal of the second gas concentration detection sensor when an output signal of the second gas concentration detection sensor indicates a gas concentration in the second concentration range and an output signal of the first gas concentration detection sensor indicates a gas concentration lower than the lower limit value of the first concentration range, output an indication value based on an output signal of either the first gas concentration detection sensor or the second gas concentration detection sensor when an output signal of the first gas concentration detection sensor indicates a gas concentration in the first concentration range and an output signal of the second gas concentration detection sensor indicates a gas concentration in the second concentration range, and output either the lower limit value of the first concentration range or the upper limit value of the second concentration range as an indication value when an output signal of the first gas concentration detection sensor indicates a gas concentration lower than the lower limit value of the first concentration range and an output signal of the second gas concentration detection sensor indicates a gas concentration higher than the upper limit value of the second concentration range; and an indication value display unit configured to display the indication value output from the control unit; wherein the first and second gas concentration detection sensors, and the indication value display unit are connected to the control unit.

According to the present invention, there is provided a lamination molding apparatus to form a molded object, comprising: a chamber configured to cover a molding region in which a desired three-dimensional molded object is formed; an inert gas supply device configured to fill the chamber with an inert gas; and an oxygen concentration meter configured to detect an oxygen concentration in the chamber, wherein the oxygen concentration meter comprises: a first oxygen concentration detection sensor configured to detect at least the oxygen concentration in a first concentration range, a second oxygen concentration detection sensor configured to detect at least the oxygen concentration in a second concentration range, wherein an upper limit value of the second concentration range is lower than an upper limit value of the first concentration range, and a lower limit value of the second concentration range is lower than a lower limit value of the first concentration range, a control unit, when the supply of the inert gas in the chamber is started by the inert gas supply device, configured to: output an indication value based on an output signal of the first oxygen concentration detection sensor when an output signal of the first oxygen concentration detection sensor indicates an oxygen concentration in the first concentration range, output an indication value based on an output signal of the second oxygen concentration detection sensor when an output signal of the second oxygen concentration detection sensor indicates an oxygen concentration in the second concentration range and an output signal of the first oxygen concentration detection sensor indicates an oxygen concentration lower than the lower limit value of the first concentration range, and output either the lower limit value of the first concentration range or the upper limit value of the second concentration range as an indication value for a predetermined time when an output signal of the first oxygen concentration detection sensor indicates an oxygen concentration lower than the lower limit value of the first concentration range and an output signal of the second oxygen concentration detection sensor indicates an oxygen concentration higher than the upper limit value of the second concentration range, and an indication value display unit configured to display the indication value output from the control unit; wherein the first and second oxygen concentration detection sensors, and the indication value display unit are connected to the control unit.

According to the present invention, there is provided a control method of a gas concentration meter for detecting a gas concentration of a specific gas in a chamber, comprising steps of: detecting at least the gas concentration in a first concentration range by a first gas concentration detection sensor; detecting at least the gas concentration in a second concentration range by a second gas concentration detection sensor, wherein an upper limit value of the second concentration range is lower than an upper limit value of the first concentration range, and a lower limit value of the second concentration range is lower than a lower limit value of the first concentration range; outputting an indication value based on an output signal of the first gas concentration detection sensor when an output signal of the first gas concentration detection sensor indicates a gas concentration in the first concentration range and an output signal of the second gas concentration detection sensor indicates a gas concentration higher than the upper limit value of the second concentration range; outputting an indication value based on an output signal of the second gas concentration detection sensor when an output signal of the second gas concentration detection sensor indicates a gas concentration in the second concentration range and an output signal of the first gas concentration detection sensor indicates a gas concentration lower than the lower limit value of the first concentration range; outputting an indication value based on an output signal of either the first gas concentration detection sensor or the second gas concentration detection sensor when an output signal of the first gas concentration detection sensor indicates a gas concentration in the first concentration range and an output signal of the second gas concentration detection sensor indicates a gas concentration in the second concentration range; outputting either the lower limit value of the first concentration range or the upper limit value of the second concentration range as an indication value when an output signal of the first gas concentration detection sensor indicates a gas concentration lower than the lower limit value of the first concentration range and an output signal of the second gas concentration detection sensor indicates a gas concentration higher than the upper limit value of the second concentration range; and displaying the indication value output at an indication value display unit.

According to the present invention, there is provided a control method of an oxygen concentration meter for a lamination molding apparatus, comprising steps of: supplying an inert gas from an inert gas supply device into a chamber configured to cover a molding region where a desired three-dimensional molded object is formed; detecting at least an oxygen concentration in a first concentration range in the chamber with a first oxygen concentration detection sensor; detecting at least an oxygen concentration in a second concentration range in the chamber with a second oxygen concentration detection sensor, wherein an upper limit value of the second concentration range is lower than an upper limit value of the first concentration range, and a lower limit value of the second concentration range is lower than a lower limit value of the first concentration range; when the supply of the inert gas in the chamber is started by the inert gas supply device, outputting an indication value based on an output signal of the first oxygen concentration detection sensor when an output signal of the first oxygen concentration detection sensor indicates an oxygen concentration in the first concentration range, outputting an indication value based on an output signal of the second oxygen concentration detection sensor when an output signal of the first oxygen concentration detection sensor indicates an oxygen concentration lower than the lower limit value of the first concentration range and an output signal of the second oxygen concentration detection sensor indicates an oxygen concentration in the second concentration range, and outputting either the lower limit value of the first concentration range or the upper limit value of the second concentration range as an indication value for a predetermined time when an output signal of the first oxygen concentration detection sensor indicates an oxygen concentration lower than the lower limit value of the first concentration range and an output signal of the second oxygen concentration detection sensor indicates an oxygen concentration higher than the upper limit value of the second concentration range; and displaying the indication value on the indication value display unit.

According to the gas concentration meter, the control method of the gas concentration meter, the lamination molding apparatus and the control method of oxygen concentration meter for the lamination molding apparatus according to the present invention, even if a sensor for measuring a specific gas concentration, for instance, an oxygen concentration, has a detection error, it is capable of detecting a specific gas concentration without missing a detection range.

DETAILED DESCRIPTION

Embodiments will be described in detail with reference to drawings. The various features shown in the following embodiments can be combined with each other.

1. Configuration Example

Figure 1:
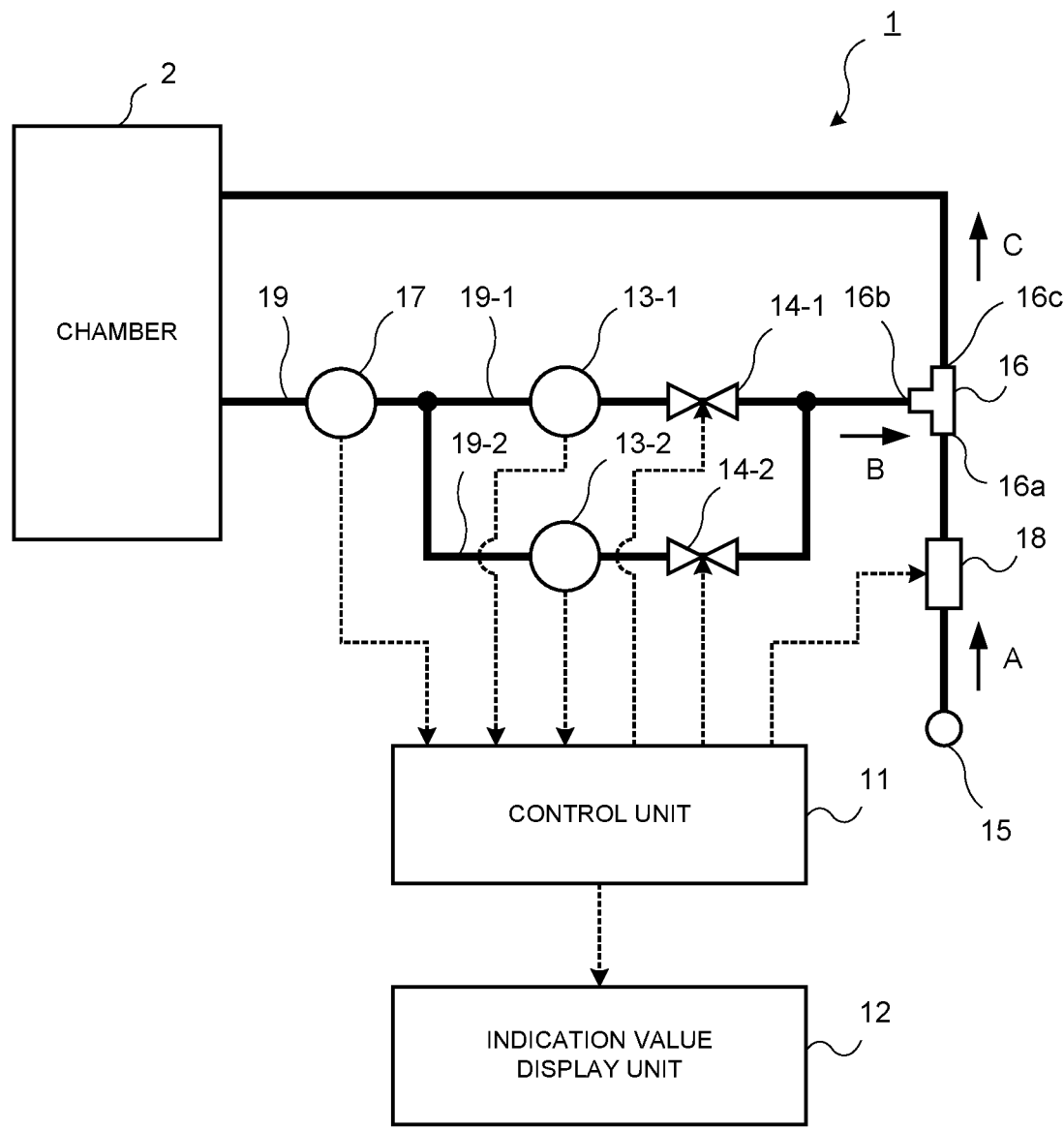
FIG. 1 is a diagram showing the configuration of a gas concentration meter 1 according to the present embodiment.

FIG. 1 is a diagram showing the configuration of a gas concentration meter 1 according to the present embodiment. As shown in FIG. 1, the gas concentration meter 1 includes a control unit 11, an indication value display unit 12, a first gas concentration detection sensor 13-1, a second gas concentration detection sensor 13-2, a first on-off valve 14-1, a second on-off valve 14-2, a gas supply port 15, an ejector 16, and a flowmeter 17, and detects a gas concentration of a specific gas in the chamber 2. The indication value display unit 12, the first gas concentration detection sensor 13-1, the second gas concentration detection sensor 13-2, the first on-off valve 14-1, the second on-off valve 14-2, and the flowmeter 17 are connected to the control unit 11. Further, the gas concentration meter 1 may include a regulator 18. The regulator 18 may be connected to the control unit 11.

Based on an output signal of the first gas concentration detection sensor 13-1 and an output signal of the second gas concentration detection sensor 13-2, the control unit 11 determines and outputs an indication value of the concentration of a specific gas in the chamber 2 to be displayed on the indication value display unit 12. The control unit 11 controls the first on-off valve 14-1 and the second on-off valve 14-2. Furthermore, the control unit 11 may control the regulator 18 based on an output signal of the flowmeter 17.

The indication value display unit 12 displays an indication value output from the control unit 11.

The first gas concentration detection sensor 13-1 detects at least a gas concentration in the first concentration range. The first concentration range is not less than the lower limit value of the first concentration range and not more than the upper limit value of the first concentration range.

The second gas concentration detection sensor 13-2 detects at least a gas concentration in the second concentration range. The second concentration range is not less than the lower limit value of the second concentration range and not more than the upper limit value of the second concentration range. The upper limit value of the second concentration range is lower than the upper limit value of the first concentration range. The lower limit value of the second concentration range is lower than the lower limit value of the first concentration range.

The first on-off valve 14-1 is a valve for passing the gas sucked from the inside of the chamber 2 to the first gas concentration detection sensor 13-1 when opened, and is realized by, for instance, a two-way solenoid valve, and opens and closes the first flow path 19-1 through which the gas flows by a control signal from the control unit 11.

The second on-off valve 14-2 is a valve for passing the gas sucked from the inside of the chamber 2 to the second gas concentration detection sensor 13-2 when opened, and is realized by, for instance, a two-way solenoid valve, and opens and closes the second flow path 19-2 through which the gas flows according by a control signal from the control unit 11.

The gas supply port 15 is a supply port connected to a gas supply device (not shown) for supplying a predetermined gas into the chamber 2 through the ejector 16. The predetermined gas supplied from the gas supply port 15 is a specific gas that can be detected by the first gas concentration detection sensor 13-1 and the second gas concentration detection sensor 13-2, a gas other than a specific gas, or a mixed gas of both. The gas supplied from the gas supply port 15 may be a gas filled in the chamber 2. Further, as long as the gas filled in the chamber 2 is supplied from another supply port (not shown), the gas supplied from the gas supply port 15 may be used only to detect the gas concentration in the chamber 2.

The ejector 16 generates a suction force by means of which the driving fluid flows therein, and sucks the gas in the chamber 2. The ejector 16 includes a gas inlet 16a, a gas suction port 16b and a gas outlet 16c, and generates a suction force at the gas suction port 16b by means of which the driving fluid flows from the gas inlet 16a to the gas outlet 16c. The driving fluid at this time is a predetermined gas supplied from the gas supply device. The gas inlet 16a is connected to the gas supply port 15. The gas outlet 16c is connected to the chamber 2. The gas suction port 16b is connected to the chamber 2 via a flow path 19. The gas suction port 16b sucks the gas in the chamber 2 by a suction force generated when the driving fluid flows. Specifically, the ejector 16 utilizes the gas supplied from the gas supply port 15 in the direction indicated by an arrow A as a driving fluid, sucks the gas from the chamber 2 in the direction indicated by an arrow B, and outflows the two toward the chamber 2 in the direction indicated by an arrow C.

The flow path 19 is divided into the first flow path 19-1 and the second flow path 19-2 on the way and then merges again. The first gas concentration detection sensor 13-1 and the first on-off valve 14-1 are provided in the first flow path 19-1. The second gas concentration detection sensor 13-2 and the second on-off valve 14-2 are provided in the second flow path 19-2. The first on-off valve 14-1 opens and closes the first flow path 19-1. The second on-off valve 14-2 opens and closes the second flow path 19-2. The first gas concentration detection sensor 13-1 detects a gas concentration of a specific gas in the gas in the chamber 2 sucked through the first flow path 19-1. The second gas concentration detection sensor 13-2 detects a gas concentration of a specific gas in the gas in the chamber 2 sucked through the second flow path 19-2.

The flowmeter 17 measures the flow rate of the gas sucked from the chamber 2. Specifically, the flowmeter 17 measures the flow rate of the gas flowing through the flow path 19. The flowmeter 17 may output a value indicating the flow rate to the control unit 11 as an output signal. The flow meter 17 may comprise a flow rate control valve (not shown) to have a function of adjusting the flow rate of the gas sucked from the chamber 2 to a predetermined flow rate on the basis of a control signal from the control unit 11. The suction of the gas in the chamber 2 is stopped in a case where the gases in the chamber 2 are not sequentially supplied to the first gas concentration detection sensor 13-1 and the second gas concentration detection sensor 13-2, the first gas concentration detection sensor 13-1 and the second gas concentration detection sensor 13-2 measure the gas concentration of the gas remaining in the flow path 19 after being sucked from the inside of the chamber 2. When the flow rate measured by the flow meter 17 is lower than a predetermined flow rate, the control unit 11 may ignore the output signals of the first gas concentration detection sensor 13-1 and the second gas concentration detection sensor 13-2 to display a warning on the indication value display unit 12.

The regulator 18 limits the pressure of the gas supplied from the gas supply port 15 to a predetermined pressure. The regulator 18 may limit the pressure of the gas supplied from the gas supply port 15 to a predetermined pressure based on a control signal from the control unit 11. It should be noted that the flow rate of the gas sucked from the chamber 2 can also be adjusted by controlling the pressure or the flow rate of the gas serving as the driving fluid of the ejector 16 by the regulator 18 or a flow rate control valve (not shown) based on a control signal from the control unit 11.

According to these configurations, for instance, when the first gas concentration detection sensor 13-1 detects the gas concentration, the control unit 11 opens the first on-off valve 14-1 and controls the second on-off valve 14-2 to close. At this time, the control unit 11 may control the flow rate control valve of the flowmeter 17 so that the measured value of the flowmeter 17 becomes a value suitable for the measurement environment of the first gas concentration detection sensor 13-1. When the second gas concentration detection sensor 13-2 detects the gas concentration, the control unit 11 opens the second on-off valve 14-2 and controls the first on-off valve 14-1 to close. At this time, the control unit 11 may control the flow rate control valve of the flowmeter 17 so that the measured value of the flowmeter 17 becomes a value suitable for the measurement environment of the second gas concentration detection sensor 13-2. That is, the control unit 11 opens the first on-off valve 14-1 when detecting the gas concentration in the first gas concentration detecting sensor 13-1, and opens the second on-off valve 14-2 when the second gas concentration detecting sensor 13-2 detects the gas concentration, and controls the gas in the chamber 2 so as to supply the gas by switching either the first gas concentration detection sensor 13-1 or the second gas concentration detection sensor 13-2. The first on-off valve 14-1 and the second on-off valve 14-2 may be replaced with, for example, one three-way solenoid valve. The first on-off valve 14-1 and the second on-off valve 14-2 may be replaced with a flow rate control valve (not shown). The flow rate control valves replaced from the first on-off valve 14-1 and the second on-off valve 14-2 are realized by, for example, an solenoid proportional valve, and can open and close the flow path 19 through which the gas flows, and adjust the flow rate of the gas suitable for the measurement environment of the first gas concentration detection sensor 13-1 and the second gas concentration detection sensor 13-2.

The control unit 11 can simultaneously acquire both the output signal of the first gas concentration detection sensor 13-1 and the output signal of the second gas concentration detection sensor 13-2. At this time, the first on-off valve 14-1 and the second on-off valve 14-2 are opened. Alternatively, the first on-off valve 14-1 and the second on-off valve 14-2 become unnecessary. The first on-off valve 14-1 and the second on-off valve 14-2 may be replaced by flow rate control valves, respectively. The control unit 11 opens each flow rate control valve replaced with the first on-off valve 14-1 and the second on-off valve 14-2 according to the ratio between the flow rate of the gas suitable for the first gas concentration detection sensor 13-1 and the flow rate of the gas suitable for the second gas concentration detection sensor 13-2, the flow rate control valve of the flowmeter 17 is controlled so that the measured value of the flowmeter 17 is the sum of the flow rate of the gas suitable for the measurement environment of the first gas concentration detection sensor 13-1 and the flow rate of the gas suitable for the measurement environment of the second gas concentration detection sensor 13-2, both the output signal of the first gas concentration detection sensor 13-1 and the output signal of the second gas concentration detection sensor 13-2 can be simultaneously acquired.

2. Selection of Indication Values

Next, the indication value output by the control unit 11 will be described with reference to FIGS. 2 to 4.

Figure 2:
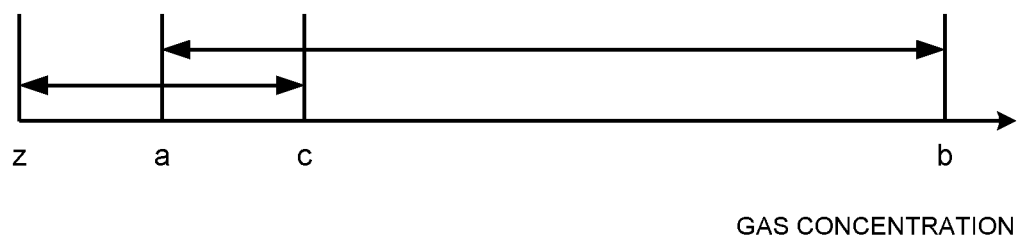
FIG. 2 is a diagram showing a concentration range in a case where a part of a first concentration range in which the first gas concentration detection sensor detects a gas concentration and a second concentration range in which the second gas concentration detection sensor detects a gas concentration overlap each other.

FIG. 2 is a diagram showing a concentration range in a case where a part of the first concentration range in which the first gas concentration detection sensor 13-1 detects a gas concentration and the second concentration range in which the second gas concentration detection sensor 13-2 detects a gas concentration overlap each other.

In the example shown in FIG. 2, the first gas concentration detection sensor 13-1 detects a gas concentration in a range from a to b, and the second gas concentration detection sensor 13-2 detects a gas concentration in a range from z to c.

Figure 3:
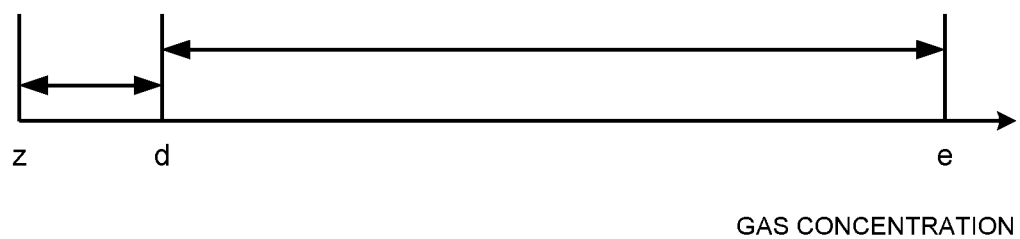
FIG. 3 is a diagram showing a concentration range in a case where the lower limit value of the first concentration range in which the first gas concentration detection sensor detects the gas concentration and the upper limit value of the second concentration range in which the second gas concentration detection sensor detects the gas concentration are the same.

FIG. 3 is a diagram showing a concentration range in a case where the upper limit value of the first concentration range in which the first gas concentration detection sensor 13-1 detects the gas concentration and the upper limit value of the second concentration range in which the second gas concentration detection sensor 13-2 detects the gas concentration are the same.

In the example shown in FIG. 3, the first gas concentration detection sensor 13-1 detects a gas concentration in a range from d to e, and the second gas concentration detection sensor 13-2 detects a gas concentration in a range from z to d.

Figure 4:
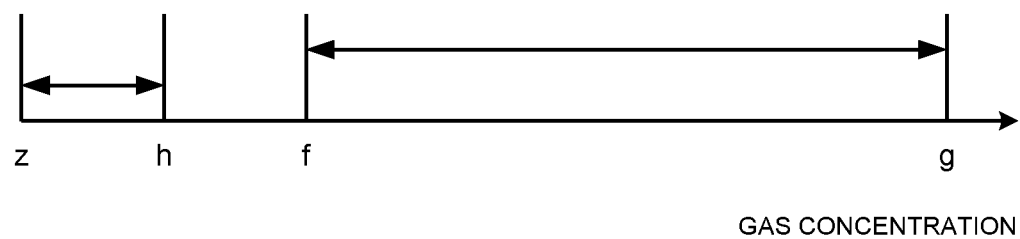
FIG. 4 is a diagram showing a concentration range in a case where the first concentration range in which the first gas concentration detection sensor detects the gas concentration and the second concentration range in which the second gas concentration detection sensor detects the gas concentration are separated from each other.

FIG. 4 is a diagram showing a concentration range in a case where the first concentration range in which the first gas concentration detection sensor 13-1 detects the gas concentration and the second concentration range in which the second gas concentration detection sensor 13-2 detects the gas concentration are separated from each other.

In the example shown in FIG. 4, the first gas concentration detection sensor 13-1 detects a gas concentration in a range from f to g, and the second gas concentration detection sensor 13-2 detects a gas concentration in a range from z to h.

When the output signal of the first gas concentration detection sensor 13-1 indicates a gas concentration in the first concentration range and the output signal of the second gas concentration detection sensor 13-2 indicates a gas concentration higher than the upper limit value of the second concentration range, the control unit 11 outputs an indication value based on the output signal of the first gas concentration detection sensor 13-1.

Specifically, when the first concentration range and the second concentration range are as shown in FIG. 2, the output signal of the first gas concentration detection sensor 13-1 is not less than a and not more than b, and when the output signal of the second gas concentration detection sensor 13-2 is higher than c, the control unit 11 outputs an indication value based on the output signal of the first gas concentration detection sensor 13-1.

When the first concentration range and the second concentration range are as shown in FIG. 3, the output signal of the first gas concentration detection sensor 13-1 is not less than d and not more than e, and when the output signal of the second gas concentration detection sensor 13-2 is higher than d, the control unit 11 outputs an indication value based on the output signal of the first gas concentration detection sensor 13-1.

When the first concentration range and the second concentration range are as shown in FIG. 4, the output signal of the first gas concentration detection sensor 13-1 is not less than f and not more than g, and when the output signal of the second gas concentration detection sensor 13-2 is higher than h, the control unit 11 outputs an indication value based on the output signal of the first gas concentration detection sensor 13-1.

When the output signal of the second gas concentration detection sensor 13-2 indicates the gas concentration in the second concentration range and the output signal of the first gas concentration detection sensor 13-1 indicates a gas concentration lower than the lower limit value of the first concentration range, the control unit 11 outputs an indication value based on the output signal of the second gas concentration detection sensor 13-2.

Specifically, when the first concentration range and the second concentration range are as shown in FIG. 2, the output signal of the second gas concentration detection sensor 13-2 is not less than z and not more than c, and when the output signal of the first gas concentration detection sensor 13-1 is lower than a, the control unit 11 outputs an indication value based on the output signal of the second gas concentration detection sensor 13-2.

When the first concentration range and the second concentration range are as shown in FIG. 3, the output signal of the second gas concentration detection sensor 13-2 is not less than z and not more than d, and when the output signal of the first gas concentration detection sensor 13-1 is lower than d, the control unit 11 outputs an indication value based on the output signal of the second gas concentration detection sensor 13-2.

When the first concentration range and the second concentration range are as shown in FIG. 4, the output signal of the second gas concentration detection sensor 13-2 is not less than z and not more than h, and when the output signal of the first gas concentration detection sensor 13-1 is lower than f, the control unit 11 outputs an indication value based on the output signal of the second gas concentration detection sensor 13-2.

Furthermore, when the control unit 11 indicates the gas concentration in the first concentration range of the output signal of the first gas concentration detection sensor 13-1 and the output signal of the second gas concentration detection sensor 13-2 indicates the gas concentration in the second concentration range, an indication value is output based on the output signal from either the first gas concentration detection sensor 13-1 or the second gas concentration detection sensor 13-2.

Whether the control unit 11 outputs an indication value based on the output signal from either the first gas concentration detection sensor 13-1 or the second gas concentration detection sensor 13-2 can be determined in advance. When it is determined that an indication value based on the output signal of the first gas concentration detection sensor 13-1 is to be output, the control unit 11 outputs an indication value based on the output signal of the first gas concentration detection sensor 13-1 regardless of the output signal of the second gas concentration detection sensor 13-2 when the output signal of the first gas concentration detection sensor 13-1 indicates a gas concentration in the first concentration range.

When it is determined that an indication value based on the output signal of the second gas concentration detection sensor 13-2 is to be output, the control unit 11 outputs an indication value based on the output signal of the second gas concentration detection sensor 13-2 regardless of the output signal of the first gas concentration detection sensor 13-1 when the output signal of the second gas concentration detection sensor 13-2 indicates a gas concentration in the second concentration range.

Specifically, when the first concentration range and the second concentration range are as shown in FIG. 2, an output signal of the first gas concentration detection sensor 13-1 is not less than a and not more than b, and when the output signal of the second gas concentration detection sensor 13-2 is not less than z and not more than c, the control unit 11 outputs an indication value based on an output signal of one of the first gas concentration detection sensor 13-1 and the second gas concentration detection sensor 13-2.

In addition, when the first concentration range and the second concentration range are as shown in FIG. 3, the output signal of the first gas concentration detection sensor 13-1 is not less than d and not more than e, and when the output signal of the second gas concentration detection sensor 13-2 is not less than z and not more than d, the control unit 11 outputs an indication value based on an output signal of either the first gas concentration detection sensor 13-1 or the second gas concentration detection sensor 13-2.

Further, when the first concentration range and the second concentration range are as shown in FIG. 4, the output signal of the first gas concentration detection sensor 13-1 is not less than f and not more than g, and when the output signal of the second gas concentration detection sensor 13-2 is not less than z and not more than h, the control unit 11 outputs an indication value based on an output signal of either the first gas concentration detection sensor 13-1 or the second gas concentration detection sensor 13-2.

Furthermore, when the control unit 11 indicates a gas concentration lower than the lower limit value of the first concentration range by the output signal of the first gas concentration detection sensor 13-1, and the output signal of the second gas concentration detection sensor 13-2 indicates a gas concentration higher than the upper limit value of the second concentration range, either the lower limit value of the first concentration range or the upper limit value of the second concentration range is output as an indication value. At this time, the control unit 11 may preferably outputs an indication value for a predetermined time, and thereafter, newly outputs an indication value based on an output signal of the first gas concentration detection sensor 13-1 and the second gas concentration detection sensor 13-2.

In addition, when the control unit 11 indicates a gas concentration lower than the lower limit value of the first concentration range by the output signal of the first gas concentration detection sensor 13-1, and when the output signal of the second gas concentration detection sensor 13-2 indicates a gas concentration higher than the upper limit value of the second concentration range, the lower limit value of the first concentration range may be output as an indication value if the immediately preceding indication value is a value based on the output signal of the first gas concentration detection sensor 13-1 or the lower limit value of the first concentration range, and the upper limit value of the second concentration range may be output as an indication value if the immediately preceding indication value is a value based on the output signal of the second gas concentration detection sensor 13-2 or the upper limit value of the second concentration range. At this time, the control unit 11 may preferably output the indication value for a predetermined time.

Further, when the control unit 11 indicates a gas concentration lower than the lower limit value of the first concentration range by an output signal of the first gas concentration detection sensor 13-1, and when the output signal of the second gas concentration detection sensor 13-2 indicates a gas concentration higher than the upper limit of the second concentration range, whichever one of the lower limit value of the first concentration range and the upper limit value of the second concentration range is higher than the upper limit value may be output as the indication value. At this time, the control unit 11 may preferably output the indication value for a predetermined time.

Furthermore, when the control unit 11 indicates a gas concentration lower than the lower limit value of the first concentration range by the output signal of the first gas concentration detection sensor 13-1, and when the output signal of the second gas concentration detection sensor 13-2 indicates a gas concentration higher than the upper limit value of the second concentration range, if the unit of the first concentration range and the unit of the second concentration range are different even when the lower limit value of the first concentration range is the same as the upper limit value of the second concentration range, either the lower limit value of the first concentration range or the upper limit value of the second concentration range may be output as an indication value. At this time, the control unit 11 may preferably output the indication value for a predetermined time.

Specifically, when the first concentration range and the second concentration range are as shown in FIG. 2, if the output signal of the first gas concentration detection sensor 13-1 is lower than a and the output signal of the second gas concentration detection sensor 13-2 is higher than c, then the control unit 11 outputs either a or c as an indication value. At this time, the control unit 11 may preferably output either a or c as an indication value for a predetermined time.

In addition, when the first concentration range and the second concentration range are as shown in FIG. 2, if the output signal of the first gas concentration detection sensor 13-1 is lower than a and the output signal of the second gas concentration detection sensor 13-2 is higher than c, the control unit 11 may output a as an indication value if the immediately preceding indication value is the output signal of the first gas concentration detection sensor 13-1 or a, and may output c as an indication value if the immediately preceding indication value is the output signal of the second gas concentration detection sensor 13-2 or c. At this time, the control unit 11 may preferably output the indication value for a predetermined time.

Further, when the first concentration range and the second concentration range are as shown in FIG. 2, if the output signal of the first gas concentration detection sensor 13-1 is lower than a and the output signal of the second gas concentration detection sensor 13-2 is higher than c, then the control unit 11 may output c as an indication value which is higher than a. At this time, the control unit 11 may preferably output c which is higher than a as an indication value for a predetermined time.

Furthermore, when the first concentration range and the second concentration range are as shown in FIG. 3, if the output signal of the first gas concentration detection sensor 13-1 is lower than d and the output signal of the second gas concentration detection sensor 13-2 is higher than d, then the control unit 11 outputs d as an indication value. At this time, the control unit 11 may preferably output d as an indication value for a predetermined time.

Moreover, when the first concentration range and the second concentration range are as shown in FIG. 3, if the output signal of the first gas concentration detection sensor 13-1 is lower than d and the output signal of the second gas concentration detection sensor 13-2 is higher than d, then the control unit 11 may output either the lower limit value of the first concentration range or the upper limit value of the second concentration range as an indication value if the unit of the first concentration range and the second concentration range are different. At this time, the control unit 11 may preferably output the indication value for a predetermined time.

Further, when the first concentration range and the second concentration range are as shown in FIG. 4, if the output signal of the first gas concentration detection sensor 13-1 is lower than f and the output signal of the second gas concentration detection sensor 13-2 is higher than h, then the control unit 11 outputs either for h as an indication value. At this time, the control unit 11 may preferably output either f or h as an indication value for a predetermined time.

In addition, when the first concentration range and the second concentration range are as shown in FIG. 4, if the output signal of the first gas concentration detection sensor 13-1 is lower than f and the output signal of the second gas concentration detection sensor 13-2 is higher than h, the control unit 11 may output f as an indication value if the immediately preceding indication value is the output signal of the first gas concentration detection sensor 13-1 or f, and may output h as an indication value if the immediately preceding indication value is the output signal of the second gas concentration detection sensor 13-2 or h. At this time, the control unit 11 may preferably output the indication value for a predetermined time.

Moreover, when the first concentration range and the second concentration range are as shown in FIG. 4, if the output signal of the first gas concentration detection sensor 13-1 is lower than f and the output signal of the second gas concentration detection sensor 13-2 is higher than h, then the control unit 11 may output f which has a higher value than h as an indication value. At this time, the control unit 11 may preferably output f which is higher than h as an indication value for a predetermined time.

3. Output Signal Error

Incidentally, when the indication value based on the output signal of the first gas concentration detection sensor 13-1 and the indication value based on the output signal of the second gas concentration detection sensor 13-2 are different, although the control unit 11 selects one of these, the reason why the indication value based on the output signal of the first gas concentration detection sensor 13-1 and the indication value based on the output signal of the second gas concentration detection sensor 13-2 are different, and the reason why it is permissible to select one of them will be described.

The reason why the indication value based on the output signal of the first gas concentration detection sensor 13-1 and the output signal of the second gas concentration detection sensor 13-2 are different is due to the detection error of the first gas concentration detection sensor 13-1 and the detection error of the second gas concentration detection sensor 13-2.

Figure 5:
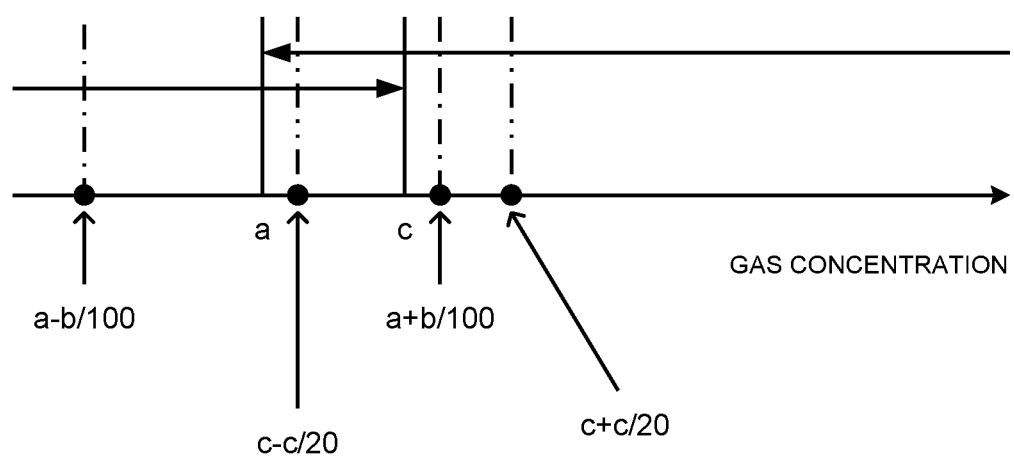
FIG. 5 is a diagram illustrating an error in the concentration range shown in FIG. 2.
Figure 6:
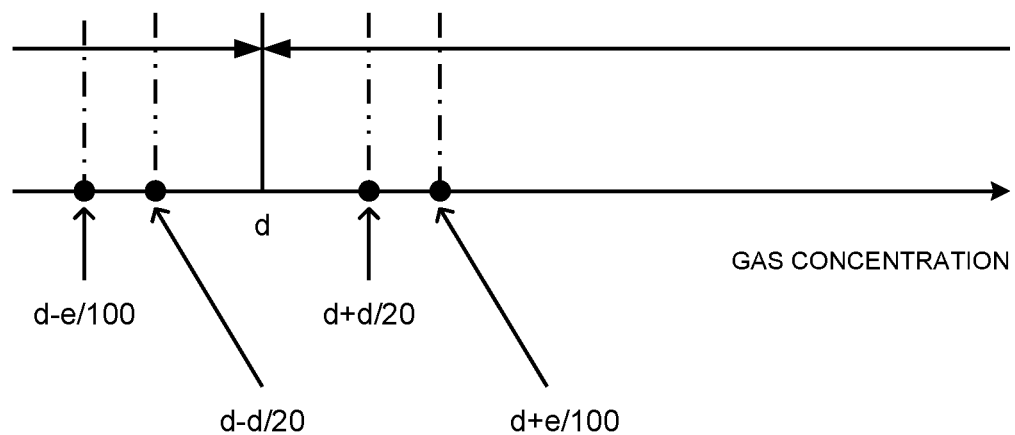
FIG. 6 is a diagram illustrating an error in the concentration range shown in FIG. 3.

Hereinafter, the detection error will be described. FIG. 5 is a diagram illustrating an error in the concentration range shown in FIG. 2. Moreover, FIG. 6 is a diagram illustrating an error in the concentration range shown in FIG. 3.

It is assumed that the detection error of the first gas concentration detection sensor 13-1 is 1% with respect to the full scale (FS), and the detection error of the second gas concentration detection sensor 13-2 is 5% with respect to the full scale. In this case, in the example of the concentration range shown in FIG. 2, even if the indication value based on the output signal of the first gas concentration detection sensor 13-1 is a, the actual gas concentration value may be in the range of a−b/100 or more and a+b/100 or less. On the other hand, even if the indication value based on the output signal of the second gas concentration detection sensor 13-2 is c, the actual gas concentration value may be in the range of c−c/20 or more and c+c/20 or less.

Similarly, in the example of the concentration range shown in FIG. 3, even if the indication value based on the output signal of the first gas concentration detection sensor 13-1 is d, the actual gas concentration value may be in a range of d−e/100 or more and d+e/100 or less. On the other hand, even if the indication value based on the output signal of the second gas concentration detection sensor 13-2 is d, the actual gas concentration value may be in a range of d−d/20 or more and d+d/20 or less.

As described above, in the vicinity of the boundary between the first concentration range and the second concentration range, there are cases where the indication value based on the output signal of the first gas concentration detection sensor 13-1 and the indication value based on the output signal of the second gas concentration detection sensor 13-2 are different, or both may indicate values deviated from the concentration range.

However, even if the indication value based on the output signal of the first gas concentration detection sensor 13-1 and the indication value based on the output signal of the second gas concentration detection sensor 13-2 are different, any value is in the allowable range since each value is within the range of the detection error.

In the case of the concentration range shown in FIG. 4, since the first concentration range and the second concentration range are separated from each other, and it is clear that the value in the vicinity of the boundary between the first concentration range and the second concentration range is not required at the design stage, there is no problem that the indication value based on the output signal of the first gas concentration detection sensor 13-1 is different from the indication value based on the output signal of the second gas concentration detection sensor 13-2.

4. Operation of Control Unit 11

Figure 7:
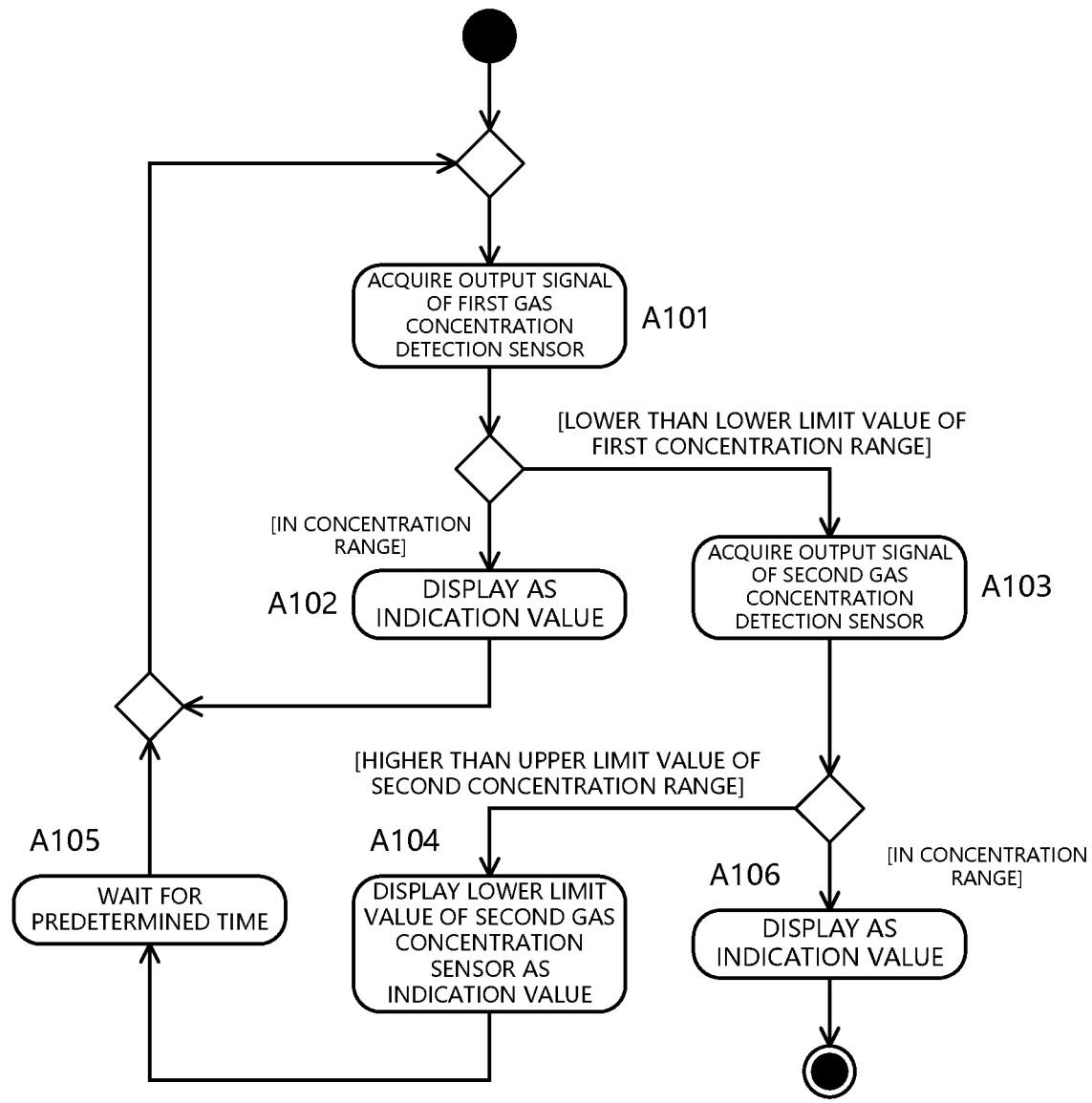
FIG. 7 is an activity diagram showing a flow of an operation of a control unit 11 when the detection of the gas concentration is started by the first gas concentration detection sensor.
Figure 8:
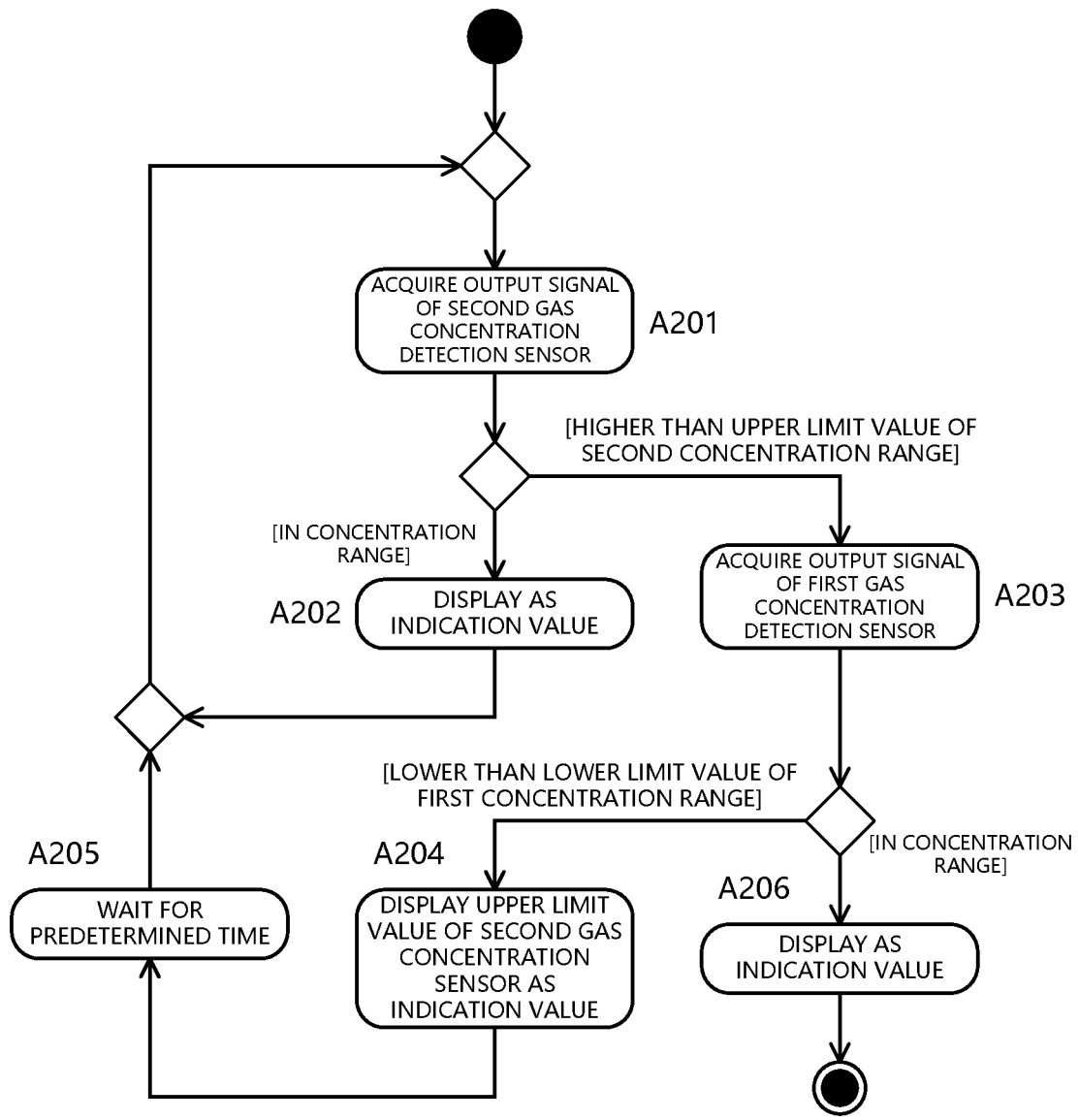
FIG. 8 is an activity diagram showing a flow of an operation of the control unit 11 when the detection of the gas concentration is started by the second gas concentration detection sensor.

Next, an operation flow of the control unit 11 will be described. FIG. 7 is an activity diagram showing a flow of an operation of the control unit 11 when the detection of the gas concentration is started from the detection of the gas concentration by the first gas concentration detection sensor. Moreover, FIG. 8 is an activity diagram showing a flow of an operation of the control unit 11 when the detection of the gas concentration is started from the detection of the gas concentration by the second gas concentration detection sensor.

When the detection of the gas concentration is started from the detection of the gas concentration by the first gas concentration detection sensor 13-1, the control unit 11 first acquires an output signal of the first gas concentration detection sensor 13-1 (A101). As a result, if the indication value based on the output signal is in the first concentration range, the indication value is displayed on the indication value display unit 12 (A102), and the output signal of the first gas concentration detection sensor 13-1 is acquired again.

On the other hand, if the indication value based on the output signal is lower than the lower limit value of the first concentration range, the control unit 11 acquires the output signal of the second gas concentration detection sensor 13-2 (A103). As a result, if the indication value based on the output signal is higher than the upper limit value of the second concentration range, the control unit 11 displays the lower limit value of the first concentration range on the indication value display unit 12 (A104), waits for a predetermined time (A105), and acquires the output signal of the first gas concentration detection sensor 13-1 again.

If the indication value based on the output signal of the second gas concentration detection sensor 13-2 is in the second concentration range, the control unit 11 displays the indication value on the indication value display unit 12 (A106).

Thereafter, the control unit 11 operates in the same manner as in the case where the detection of the gas concentration is started from the detection of the gas concentration by the second gas concentration detection sensor 13-2.

When the detection of the gas concentration is started from the detection of the gas concentration by the second gas concentration detection sensor 13-2, the control unit 11 first acquires an output signal of the second gas concentration detection sensor 13-2 (A201). As a result, if the indication value based on the output signal is in the second concentration range, the indication value is displayed on the indication value display unit 12 (A202), and the output signal of the second gas concentration detection sensor 13-2 is acquired again.

On the other hand, if the indication value based on the output signal is higher than the upper limit value of the second concentration range, the control unit 11 acquires the output signal of the first gas concentration detection sensor 13-1 (A203). If the indication value based on the output signal is lower than the lower limit value of the first concentration range, the control unit 11 displays the upper limit of the second concentration range on the indication value display unit 12 (A204), waits for a predetermined time (A205), and acquires the output signal of the second gas concentration detection sensor 13-2 again.

Further, when the indication value based on the output signal of the first gas concentration detection sensor 13-1 is in the first concentration range, the control unit 11 displays the indication value on the indication value display unit 12 (A206).

Thereafter, the control unit 11 operates in the same manner as in the case where the detection of the gas concentration is started from the detection of the gas concentration by the first gas concentration detection sensor 13-1.

5. Lamination Molding Apparatus

Figure 9:
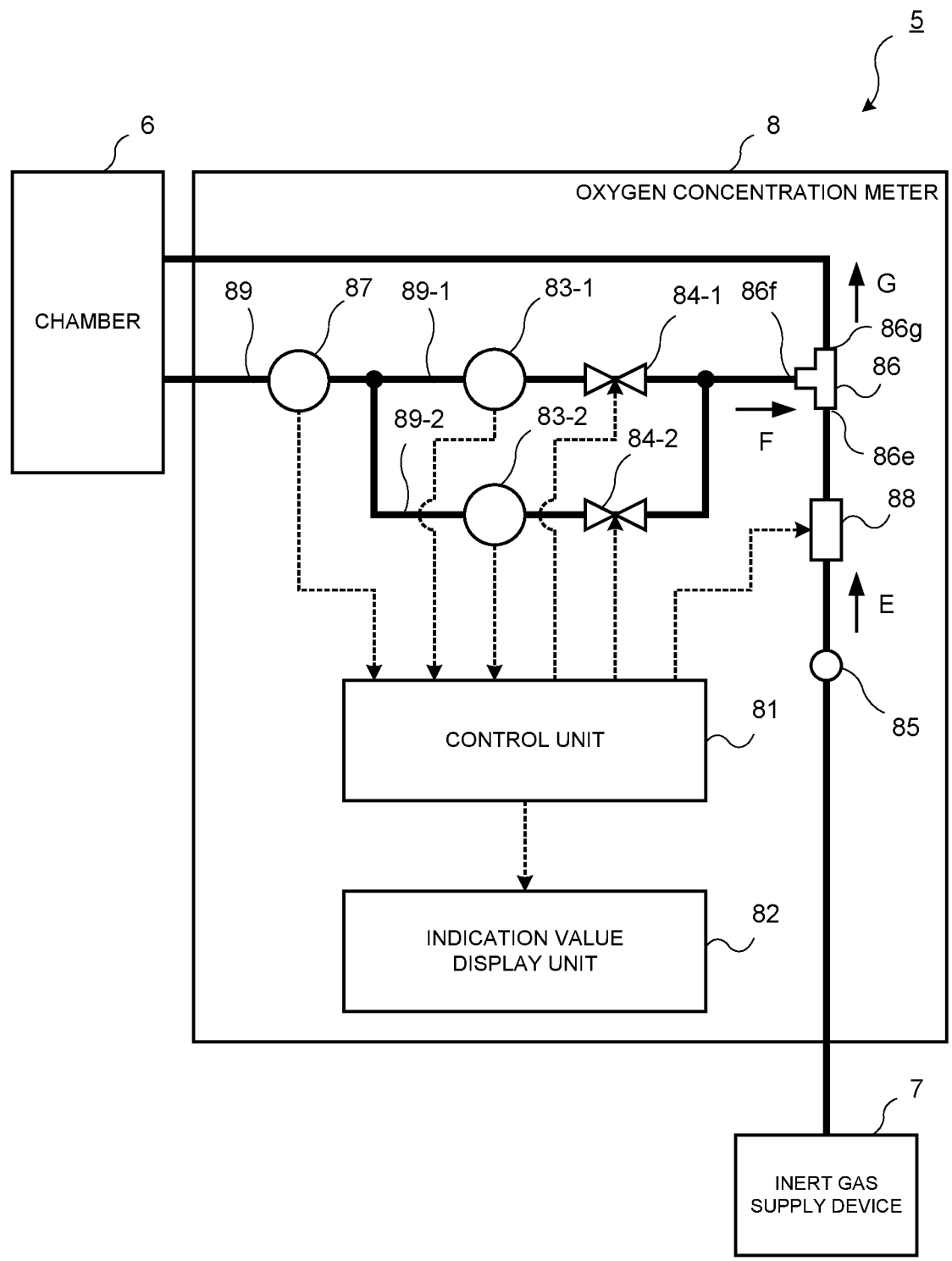
FIG. 9 is a diagram showing the configuration of the lamination molding apparatus 5 according to the present embodiment.

FIG. 9 is a diagram showing the configuration of a lamination molding apparatus 5 according to the present embodiment. As shown in FIG. 9, the lamination molding apparatus 5 includes at least a chamber 6, an inert gas supply device 7, and an oxygen concentration meter 8. It should be noted that the description of the general configuration of the lamination molding apparatus 5 is omitted.

The chamber 6 is configured to cover a molding region in which a desired three-dimensional molded object is formed. In the chamber 6, a table having a molding region where a desired three-dimensional molded object is formed, a powder layer forming unit for forming a powder layer of a metal material powder in the molding region, and the like are arranged.

The inert gas supply device 7 fills the chamber with an inert gas.

The oxygen concentration meter 8 includes a control unit 81, an indication value display unit 82, a first oxygen concentration detection sensor 83-1, a second oxygen concentration detection sensor 83-2, a first on-off valve 84-1, a second on-off valve 84-2, a gas supply port 85, an ejector 86, and a flowmeter 87, and detects the oxygen concentration in the chamber 6. The indication value display unit 82, the first oxygen concentration detection sensor 83-1, the second oxygen concentration detection sensor 83-2, the first on-off valve 84-1, the second on-off valve 84-2, and the flowmeter 87 are connected to the control unit 81. The oxygen concentration meter 8 may include a regulator 88. The regulator 88 may be connected to the control unit 81.

Based on the output signal of the first oxygen concentration detection sensor 83-1 and the output signal of the second oxygen concentration detection sensor 83-2, the control unit 81 determines and outputs an indication value of the oxygen concentration in the chamber 6 to be displayed on the indication value display unit 82. The control unit 81 controls the first on-off valve 84-1 and the second on-off valve 84-2. Moreover, the control unit 81 may control the regulator 88 based on the output signal of the flowmeter 87.

The indication value display unit 82 displays an indication value output from the control unit 81.

The first oxygen concentration detection sensor 83-1 detects at least an oxygen concentration in the first concentration range.

The second oxygen concentration detection sensor 83-2 detects at least an oxygen concentration in a range including the second concentration range. The upper limit value of the second concentration range is lower than the upper limit value of the first concentration range, and the lower limit value of the second concentration range is lower than the lower limit value of the first concentration range.

The first on-off valve 84-1 is a valve for passing the gas sucked from the inside of the chamber 6 when opened to the first oxygen concentration detection sensor 83-1 and is realized by, for example, a two-way solenoid valve, and opens and closes the first flow path 89-1 through which the gas flows according to a control signal from the control unit 81.

The second on-off valve 84-2 is a valve for passing the gas sucked from the inside of the chamber 6 when opened to the second oxygen concentration detection sensor 83-2 and is realized by, for example, a two-way solenoid valve, and opens and closes the first flow path 89-1 through which the gas flows according to a control signal from the control unit 81.

The gas supply port 85 is a supply port for supplying an inert gas into the chamber 6 through the ejector 86. The gas supply port 85 is connected to the inert gas supply device 7. The inert gas supplied from the gas supply port 85 is filled in the chamber 6. Moreover, if the inert gas filled in the chamber 6 is supplied from another supply port (not shown), the inert gas supplied from the gas supply port 85 may be used only to detect the oxygen concentration in the chamber 6.

The ejector 86 generates a suction force by means of which the driving fluid flows therein, and sucks the gas in the chamber 6. The ejector 86 includes a gas inlet 86e, a gas suction port 86f, and a gas outlet 86g, and generates a suction force at the gas suction port 86f by means of which the driving fluid flows from the gas inlet 86e to the gas outlet 86g. The driving fluid at this time is an inert gas supplied from the inert gas supply device 7. The gas inlet 86e is connected to the gas supply port 85. The gas outlet 86g is connected to the chamber 6. The gas suction port 86f is connected to the chamber 6 via a flow path 89. The gas suction port 86f sucks the gas in the chamber 6 by a suction force generated when the driving fluid flows. Specifically, the ejector 86 utilizes the inert gas supplied from the gas supply port 85 in a direction indicated by an arrow E as a driving fluid, sucks the gas from the chamber 6 in a direction indicated by an arrow F, and outflows the two toward the chamber 6 in the direction indicated by an arrow G.

The flow path 89 is divided into the first flow path 89-1 and the second flow path 89-2 on the way and then merges again. The first oxygen concentration detection sensor 83-1 and the first on-off valve 84-1 are provided in the first flow path 89-1. The second oxygen concentration detection sensor 83-2 and the second on-off valve 84-2 are provided in the second flow path 89-2. The first on-off valve 84-1 opens and closes the first flow path 89-1. The second on-off valve 84-2 opens and closes the second flow path 89-2. The first oxygen concentration detection sensor 83-1 detects the oxygen concentration in the gas in the chamber 6 sucked through the first flow path 89-1. The second oxygen concentration detection sensor 83-2 detects the oxygen concentration in the gas in the chamber 6 sucked through the second flow path 89-2.

The flowmeter 87 measures the flow rate of the gas sucked from the chamber 6. Specifically, the flowmeter 87 measures the flow rate of the gas flowing through the flow path 89. The flowmeter 87 may output a value indicating the flow rate to the control unit 81 as an output signal. The flow meter 87 may have a flow rate control valve (not shown) to have a function of adjusting the flow rate of the gas sucked from the chamber 6 to a predetermined flow rate on the basis of a control signal from the control unit 81. Note that when the suction of the gas in the chamber 6 is stopped and the gas in the chamber 6 is not sequentially supplied to the first oxygen concentration detection sensor 83-1 and the second oxygen concentration detection sensor 83-2, the first oxygen concentration detection sensor 83-1 and the second oxygen concentration detection sensor 83-2 measure the oxygen concentration of the gas remaining in the flow path 89 after being sucked from the inside of the chamber 6. When the flow rate measured by the flowmeter 87 is lower than the predetermined flow rate, the control unit 81 may ignore the output signals of the first oxygen concentration detection sensor 83-1 and the second oxygen concentration detection sensor 83-2 and display a warning on the indication value display unit 82.

The regulator 88 limits the pressure of the inert gas supplied from the gas supply port 85 to a predetermined pressure. The regulator 88 may limit the pressure of the inert gas supplied from the gas supply port 85 to a predetermined pressure based on a control signal from the control unit 81. The flow rate of the gas sucked from the chamber 6 can also be adjusted by controlling the pressure or the flow rate of the gas to be the driving fluid of the ejector 86 by the regulator 88 or a flow rate control valve (not shown) based on a control signal from the control unit 81.

According to these configurations, for example, when the oxygen concentration is detected by the first oxygen concentration detection sensor 83-1, the control unit 81 opens the first on-off valve 84-1 and controls the second on-off valve 84-2 to close. At this time, the control unit 81 may control the flow rate control valve of the flowmeter 87 so that the measured value of the flowmeter 87 becomes a value suitable for the measurement environment of the first oxygen concentration detection sensor 83-1. When the second oxygen concentration detection sensor 83-2 detects the oxygen concentration, the control unit 81 opens the second on-off valve 84-2 and controls the first on-off valve 84-1 to close. At this time, the control unit 81 may control the flow rate control valve of the flowmeter 87 so that the measured value of the flowmeter 87 becomes a value suitable for the measurement environment of the second oxygen concentration detection sensor 83-2. That is, the control unit 81 opens the first on-off valve 84-1 when the oxygen concentration is detected by the first oxygen concentration detecting sensor 83-1, opens the second on-off valve 84-2 when the oxygen concentration is detected by the second oxygen concentration detecting sensor 83-2, and controls the gas in the chamber 6 so as to supply the gas by switching either the first oxygen concentration detection sensor 83-1 or the second oxygen concentration detection sensor 83-2. The first on-off valve 84-1 and the second on-off valve 84-2 may be replaced with, for example, one three-way solenoid valve. Further, the first on-off valve 84-1 and the second on-off valve 84-2 may be replaced with flow rate control valves (not shown), respectively. Each flow rate control valve replaced from the first on-off valve 84-1 and the second on-off valve 84-2 is realized by, for example, an solenoid proportional valve, and can open and close the flow path 89 through which the gas flows based on the control signal from the control unit 11 and adjust the flow rate of the gas suitable for the measurement environment of the first oxygen concentration detection sensor 83-1 and the second oxygen concentration detection sensor 83-2.

It should be noted that the control unit 81 can simultaneously acquire both the output signal of the first oxygen concentration detection sensor 83-1 and the output signal of the second oxygen concentration detection sensor 83-2. At this time, the first on-off valve 84-1 and the second on-off valve 84-2 are opened respectively. Alternatively, the first on-off valve 84-1 and the second on-off valve 84-2 become unnecessary. The first on-off valve 84-1 and the second on-off valve 84-2 may be replaced with the flow rate control valves, respectively. The control unit 81 opens each flow rate control valve replaced from the first on-off valve 84-1 and the second on-off valve 84-2 according to the ratio between the flow rate of the gas suitable for the first oxygen concentration detection sensor 83-1 and the flow rate of the gas suitable for the second oxygen concentration detection sensor 83-2, the flow rate control valve of the flowmeter 87 is controlled so that the measured value of the flowmeter 87 is the sum of the flow rate of the gas suitable for the measurement environment of the first oxygen concentration detection sensor 83-1 and the flow rate of the gas suitable for the measurement environment of the second oxygen concentration detection sensor 83-2, both the output signal of the first oxygen concentration detection sensor 83-1 and the output signal of the second oxygen concentration detection sensor 83-2 can be simultaneously acquired.

6. Selection of Indication Values

Since the method of selecting the indication value by the control unit 81 is the same as replacing the "gas concentration" with "oxygen concentration" in the above description of the selection of the indication value by the control unit 11, the description thereof will be omitted.

7. Operation of Control Unit 81

Figure 10:
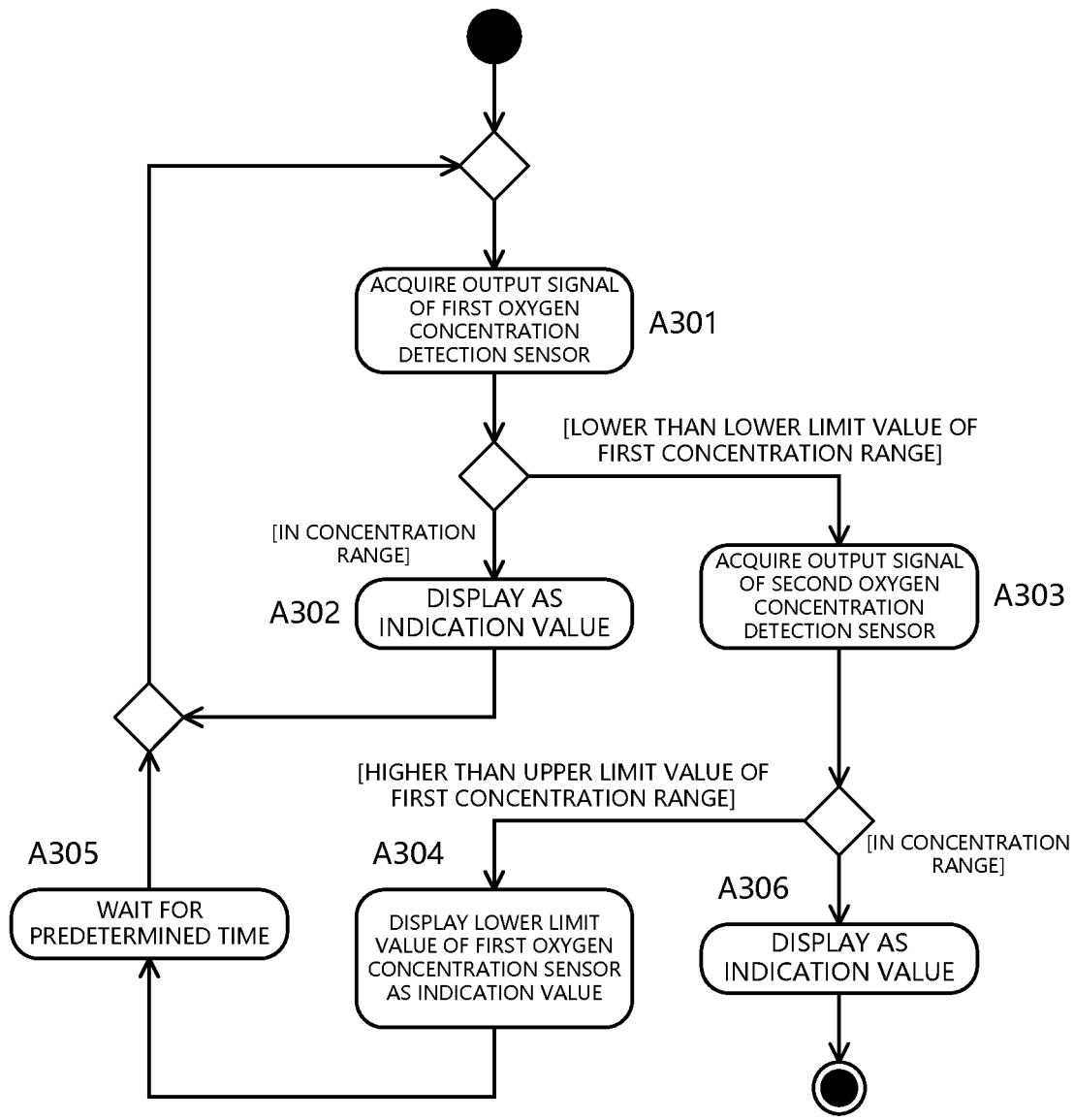
FIG. 10 is an activity diagram showing a flow of an operation of a control unit 81 when the detection of the oxygen concentration is started by the first oxygen concentration detection sensor.
Figure 11:
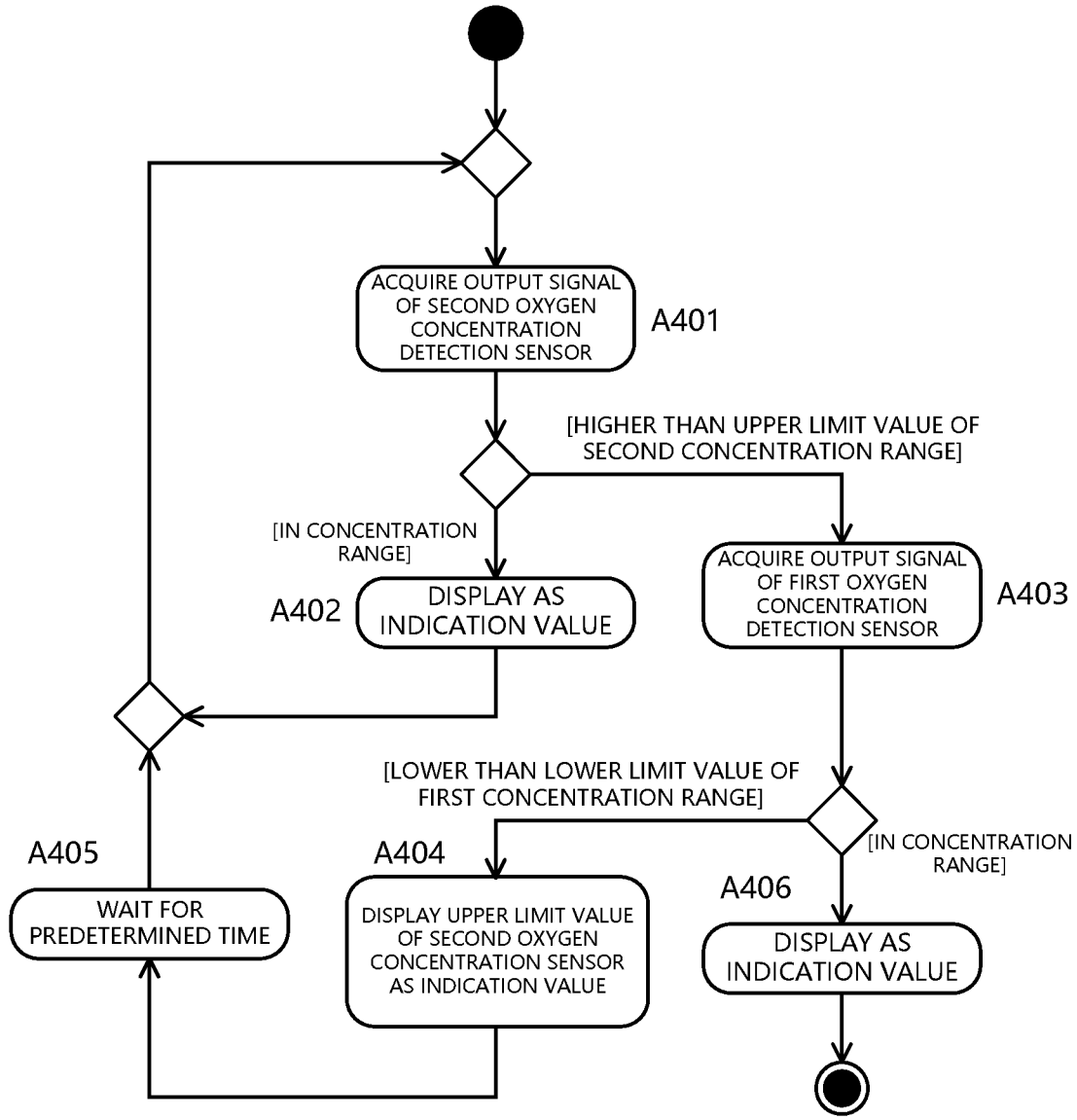
FIG. 11 is an activity diagram showing a flow of an operation of the control unit 81 when the detection of the oxygen concentration is started by the second oxygen concentration detection sensor.

Next, an operation flow of the control unit 81 will be described. FIG. 10 is an activity diagram showing a flow of an operation of a control unit 81 when the detection of the oxygen concentration is started by the first oxygen concentration detection sensor. Further, FIG. 11 is an activity diagram showing a flow of an operation of the control unit 81 when the detection of the oxygen concentration is started by the second oxygen concentration detection sensor.

First, the control unit 81 acquires an output signal of the first oxygen concentration detection sensor 83-1 (A301). As a result, if the indication value based on the output signal is in the first concentration range, the indication value is displayed on the indication value display unit 82 (A302), and the output signal of the first oxygen concentration detection sensor 83-1 is acquired again.

On the other hand, if the indication value based on the output signal is lower than the lower limit value of the first concentration range, the control unit 81 acquires the output signal of the second oxygen concentration detection sensor 83-2 (A303). As a result, if the indication value based on the output signal is higher than the upper limit value of the second concentration range, the control unit 81 displays the lower limit value of the first concentration range on the indication value display unit 82 (A304), waits for a predetermined time (A305), and acquires the output signal of the first oxygen concentration detection sensor 83-1 again.

If the indication value based on the output signal of the second oxygen concentration detection sensor 83-2 is in the second concentration range, the control unit 81 displays the indication value on the indication value display unit 82 (A306), and then starts the detection of the oxygen concentration by the second oxygen concentration detection sensor 83-2.

The control unit 81 first acquires an output signal of the second oxygen concentration detection sensor 83-2 (A401). As a result, if the indication value based on the output signal is in the second concentration range, the indication value is displayed on the indication value display unit 82 (A402), and the output signal of the second oxygen concentration detection sensor 83-2 is acquired again.

On the other hand, if the indication value based on the output signal is higher than the upper limit value of the second concentration range, the control unit 81 acquires the output signal of the first oxygen concentration detection sensor 83-1 (A403). Therefore, if the indication value based on the output signal is lower than the lower limit value of the first concentration range, the control unit 11 displays the upper limit value of the second concentration range on the indication value display unit 12 (A404), waits for a predetermined time (A405), and acquires the output signal of the second oxygen concentration detection sensor 83-2 again.

Moreover, if the indication value based on the output signal of the first oxygen concentration detection sensor 83-1 is in the first concentration range, the control unit 81 displays the indication value on the indication value display unit 12 (A406), and then starts to detect the oxygen concentration by the first oxygen concentration detection sensor 83-1.

It should be noted that when filling the chamber 6 with the inert gas, it is necessary for the lamination molding apparatus 5 to confirm whether the degree of filling is sufficient or not. However, it is unnecessary to detect the oxygen concentration when exhausting the inert gas from the chamber 6, thus the control unit 81 operates differently from the control unit 11 described above.

The invention claimed is:

1. A lamination molding apparatus to form a molded object, comprising:
   a chamber configured to cover a molding region in which a desired three-dimensional molded object is formed;
   an inert gas supply device configured to fill the chamber with an inert gas; and
   an oxygen concentration meter configured to detect an oxygen concentration in the chamber, wherein the oxygen concentration meter comprises:
   a first oxygen concentration detection sensor configured to detect at least the oxygen concentration in a first concentration range,
   a second oxygen concentration detection sensor configured to detect at least the oxygen concentration in a second concentration range, wherein an upper limit value of the second concentration range is lower than an upper limit value of the first concentration range, and a lower limit value of the second concentration range is lower than a lower limit value of the first concentration range,
   a control unit, when the supply of the inert gas in the chamber is started by the inert gas supply device, configured to:
   output an indication value based on an output signal of the first oxygen concentration detection sensor when an output signal of the first oxygen concentration detection sensor indicates an oxygen concentration in the first concentration range,
   output an indication value based on an output signal of the second oxygen concentration detection sensor when an output signal of the second oxygen concentration detection sensor indicates an oxygen concentration in the second concentration range and an output signal of the first oxygen concentration detection sensor indicates an oxygen concentration lower than the lower limit value of the first concentration range, and
   output either the lower limit value of the first concentration range or the upper limit value of the second concentration range as an indication value for a predetermined time when an output signal of the first oxygen concentration detection sensor indicates an oxygen concentration lower than the lower limit value of the first concentration range and an output signal of the second oxygen concentration detection sensor indicates an oxygen concentration higher than the upper limit value of the second concentration range, and
   an indication value display unit configured to display the indication value output from the control unit; wherein the first and second oxygen concentration detection sensors, and the indication value display unit are connected to the control unit.

2. The lamination molding apparatus according to claim 1, wherein the control unit is configured to output the lower limit value of the first concentration range as an indication value for the predetermined time when an output signal of the first oxygen concentration detection sensor indicates an oxygen concentration lower than the lower limit value of the first concentration range, and an output signal of the second oxygen concentration detection sensor indicates an oxygen concentration higher than the upper limit value of the second concentration range.

3. A control method of the oxygen concentration meter for the lamination molding apparatus according to claim 2, further comprising a step of:
   outputting the lower limit value of the first concentration range as an indication value for a predetermined time when an output signal of the first oxygen concentration detection sensor indicates an oxygen concentration lower than the lower limit value of the first concentration range and an output signal of the second oxygen concentration detection sensor indicates an oxygen concentration higher than the upper limit value of the second concentration range.

4. The lamination molding apparatus according to claim 1, wherein the oxygen concentration meter further comprising:
   first and second on-off values configured to be connected to the control unit;
   a gas supply port configured to be connected to the inert gas supply device; and
   an ejector, including a gas inlet, a gas outlet and a gas suction port, configured to generate a suction force at the gas suction port by means of which the inert gas flows from the gas inlet to the gas outlet, wherein the gas inlet is connected to the gas supply port,
   the gas outlet is connected to the chamber,
   the gas suction port is connected to the chamber through a flow path,
   the path flow is divided into first and second flow paths on a way and then merge again,
   the first oxygen concentration detection sensor and the first on-off value are provided in the first flow path,
   the second oxygen concentration detection sensor and the second on-off value are provided in the second flow path,
   the first on-off value opens and closes the first flow path, and
   the second on-off valve opens and closes the second flow path; and wherein:
   the control unit is configured to open the first on-off valve when the first oxygen concentration detection sensor detects the oxygen concentration, and to open the second on-off valve when the second oxygen concentration detection sensor detects the oxygen concentration, and to control the gas in the chamber so as to supply the gas by switching either the first oxygen concentration detection sensor or the second oxygen concentration detection sensor.

5. A control method of the oxygen concentration meter for the lamination molding apparatus according to claim 4, further comprising steps of:
   supplying an inert gas from the inert gas supply device to the chamber through the ejector;
   utilizing the suction force generated in the ejector and sucking the gas in the chamber through the flow path that is divided into first and second flow paths on the way and then merges again;
   opening the first on-off valve provided in the first flow path when the first oxygen concentration detection senor provided in the first flow path detects the oxygen concentration;
   opening the second on-off valve provided in the second flow path when the second oxygen concentration detection sensor provided in the second low path detects the oxygen concentration; and
   supplying the gas in the chamber by switching either the first oxygen concentration detection sensor or the second oxygen concentration detection sensor.

6. The lamination molding apparatus according to claim 1, wherein the control unit is configured to:
   output an indication value based on an output signal of the first oxygen concentration detection sensor when an output signal of the first oxygen concentration detection sensor indicates an oxygen concentration in the first concentration range,
   output an indication value based on an output signal of the second oxygen concentration detection sensor when an output signal of the first oxygen concentration detection sensor indicates an oxygen concentration lower than the lower limit value of the first concentration range and an output signal of the second oxygen concentration detection sensor indicates an oxygen concentration in the second concentration range, and
   output either the lower limit value of the first concentration range or the upper limit value of the second concentration range as an indication value for a predetermined time when an output signal of the first oxygen concentration detection sensor indicates an oxygen concentration lower than the lower limit value of the first concentration range and an output signal of the second oxygen concentration detection sensor indicates an oxygen concentration higher than the upper limit value of the second concentration range.

7. The lamination molding apparatus according to claim 1, wherein the control unit is configured to:
   output an indication value based on an output signal of the second oxygen concentration detection sensor when an output signal of the second oxygen concentration detection sensor indicates an oxygen concentration in the second concentration range,
   output an indication value based on an output signal of the first oxygen concentration detection sensor when an output signal of the second oxygen concentration detection sensor indicates an oxygen concentration higher than the upper limit value of the second concentration range and an output signal of the first oxygen concentration detection sensor indicates an oxygen concentration in the first concentration range, and
   output either a lower limit value of the first concentration range or the upper limit value of the second concentration range as an indication value for a predetermined time when an output signal of the second oxygen concentration detection sensor indicates an oxygen concentration higher than the upper limit value of the second concentration range and an output signal of the first oxygen concentration detection sensor indicates an oxygen concentration lower than the lower limit value of the first concentration range.

8. The lamination molding apparatus according to claim 1, wherein:
   the lower limit value of the first concentration range is same as the upper limit value of the second concentration range.

9. A control method of the oxygen concentration meter for the lamination molding apparatus according to claim 1, comprising steps of:
   supplying an inert gas from an inert gas supply device into a chamber configured to cover a molding region where a desired three-dimensional molded object is formed;
   detecting at least an oxygen concentration in a first concentration range in the chamber with a first oxygen concentration detection sensor;
   detecting at least an oxygen concentration in a second concentration range in the chamber with a second oxygen concentration detection sensor, wherein an upper limit value of the second concentration range is lower than an upper limit value of the first concentration range, and a lower limit value of the second concentration range is lower than a lower limit value of the first concentration range;
   when the supply of the inert gas in the chamber is started by the inert gas supply device,
   outputting an indication value based on an output signal of the first oxygen concentration detection sensor when an output signal of the first oxygen concentration detection sensor indicates an oxygen concentration in the first concentration range,
   outputting an indication value based on an output signal of the second oxygen concentration detection sensor when an output signal of the first oxygen concentration detection sensor indicates an oxygen concentration lower than the lower limit value of the first concentration range and an output signal of the second oxygen concentration detection sensor indicates an oxygen concentration in the second concentration range, and
   outputting either the lower limit value of the first concentration range or the upper limit value of the second concentration range as an indication value for a predetermined time when an output signal of the first oxygen concentration detection sensor indicates an oxygen concentration lower than the lower limit value of the first concentration range and an output signal of the second oxygen concentration detection sensor indicates an oxygen concentration higher than the upper limit value of the second concentration range; and
   displaying the indication value on the indication value display unit.

10. A control method of a gas concentration meter for detecting a gas concentration of a specific gas in a chamber, comprising:
   detecting at least the gas concentration in a first concentration range by a first gas concentration detection sensor;
   detecting at least the gas concentration in a second concentration range by a second gas concentration detection sensor, wherein an upper limit value of the second concentration range is lower than an upper limit value of the first concentration range, and a lower limit value of the second concentration range is lower than a lower limit value of the first concentration range;

outputting an indication value based on an output signal of the first gas concentration detection sensor when an output signal of the first gas concentration detection sensor indicates a gas concentration in the first concentration range and an output signal of the second gas concentration detection sensor indicates a gas concentration higher than the upper limit value of the second concentration range;

outputting an indication value based on an output signal of the second gas concentration detection sensor when an output signal of the second gas concentration detection sensor indicates a gas concentration in the second concentration range and an output signal of the first gas concentration detection sensor indicates a gas concentration lower than the lower limit value of the first concentration range;

outputting an indication value based on an output signal of either the first gas concentration detection sensor or the second gas concentration detection sensor when an output signal of the first gas concentration detection sensor indicates a gas concentration in the first concentration range and an output signal of the second gas concentration detection sensor indicates a gas concentration in the second concentration range;

outputting either the lower limit value of the first concentration range or the upper limit value of the second concentration range as an indication value when an output signal of the first gas concentration detection sensor indicates a gas concentration lower than the lower limit value of the first concentration range and an output signal of the second gas concentration detection sensor indicates a gas concentration higher than the upper limit value of the second concentration range; and displaying the indication value output at an indication value display unit.

11. The control method according to claim 10, further comprising:

outputting an indication value based on an output signal of the first gas concentration detection sensor when an output signal of the first gas concentration detection sensor indicates a gas concentration in the first concentration range;

outputting an indication value based on an output signal of the second gas concentration detection sensor when an output signal of the first gas concentration detection sensor indicates a gas concentration lower than the lower limit value of the first concentration range and an output signal of the second gas concentration detection sensor indicates a gas concentration in the second concentration range; and outputting either the lower limit value of the first concentration range or the upper limit value of the second concentration range as an indication value for a predetermined time when an output signal of the first gas concentration detection sensor indicates a gas concentration lower than the lower limit value of the first concentration range and an output signal of the second gas concentration detection sensor indicates a gas concentration higher than the upper limit value of the second concentration range.

12. The control method according to claim 10, further comprising:

outputting an indication value based on an output signal of the second gas concentration detection sensor when an output signal of the second gas concentration detection sensor indicates a gas concentration in the second concentration range;

outputting an indication value based on an output signal of the first gas concentration detection sensor when an output signal of the second gas concentration detection sensor indicates a gas concentration higher than the upper limit value of the second concentration range and an output signal of the first gas concentration detection sensor indicates a gas concentration in the first concentration range; and outputting either the lower limit value of the first concentration range or the upper limit value of the second concentration range as an indication value for a predetermined time when an output signal of the second gas concentration detection sensor indicates a gas concentration higher than the upper limit value of the second concentration range and an output signal of the first gas concentration detection sensor indicates a gas concentration lower than the lower limit value of the first concentration range.

13. The control method according to claim 10, further comprising:

supplying a predetermined gas from the gas supply device to the chamber through the ejector;

utilizing the suction force generated in the ejector and sucking the gas in the chamber through the flow path that is divided into first and second flow paths on the way and then merges again;

opening the first on-off valve provided in the first flow path when the first gas concentration detection sensor provided in the first flow path detects the gas concentration;

opening the second on-off valve provided in the second flow path when the second gas concentration detection sensor provided in the second flow path detects the gas concentration; and supplying the gas in the chamber by switching either the first gas concentration detection sensor or the second gas concentration detection sensor.

14. The control method according to claim 10, wherein the lower limit value of the first concentration range is same as the upper limit value of the second concentration range.

15. A control method of an oxygen concentration meter for a lamination molding apparatus, comprising:

supplying an inert gas from an inert gas supply device into a chamber configured to cover a molding region where a desired three-dimensional molded object is formed;

detecting at least an oxygen concentration in a first concentration range in the chamber with a first oxygen concentration detection sensor;

detecting at least an oxygen concentration in a second concentration range in the chamber with a second oxygen concentration detection sensor, wherein an upper limit value of the second concentration range is lower than an upper limit value of the first concentration range, and a lower limit value of the second concentration range is lower than a lower limit value of the first concentration range;

when the supply of the inert gas in the chamber is started by the inert gas supply device, outputting an indication value based on an output signal of the first oxygen concentration detection sensor when an output signal of the first oxygen concentration detection sensor indicates an oxygen concentration in the first concentration range, outputting an indication value based on an output signal of the second oxygen concentration detection sensor when an output signal of the first oxygen concentration detection sensor indicates an oxygen concentration lower than the lower limit value of the first concentration range and an output signal of the second oxygen concentration detection sensor indicates an oxygen concentration in the second concentration range, and outputting either the lower limit value of the first concentration range or the upper limit value of the second concentration range as an indication value for a predetermined time when an output signal of the first oxygen concentration detection sensor indicates an oxygen concentration lower than the lower limit value of the first concentration range and an output signal of the second oxygen concentration detection sensor indicates an oxygen concentration higher than the upper limit value of the second concentration range; and displaying the indication value on the indication value display unit.

16. The control method according to claim 15, further comprising:

outputting the lower limit value of the first concentration range as an indication value for a predetermined time when an output signal of the first oxygen concentration detection sensor indicates an oxygen concentration lower than the lower limit value of the first concentration range and an output signal of the second oxygen concentration detection sensor indicates an oxygen concentration higher than the upper limit value of the second concentration range.

17. The control method according to claim 15, further comprising:

supplying an inert gas from the inert gas supply device to the chamber through the ejector;

utilizing the suction force generated in the ejector and sucking the gas in the chamber through the flow path that is divided into first and second flow paths on the way and then merges again;

opening the first on-off valve provided in the first flow path when the first oxygen concentration detection senor provided in the first flow path detects the oxygen concentration;

opening the second on-off valve provided in the second flow path when the second oxygen concentration detection sensor provided in the second low path detects the oxygen concentration; and supplying the gas in the chamber by switching either the first oxygen concentration detection sensor or the second oxygen concentration detection sensor.

* * * * *